(12) United States Patent
Conlon

(10) Patent No.: US 10,369,900 B1
(45) Date of Patent: Aug. 6, 2019

(54) ONBOARD DC CHARGING CIRCUIT USING TRACTION DRIVE COMPONENTS

(71) Applicant: GM GLOBAL TECHNOLOGY OPERATIONS LLC, Detroit, MI (US)

(72) Inventor: Brendan M. Conlon, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 33 days.

(21) Appl. No.: 15/899,419

(22) Filed: Feb. 20, 2018

(51) Int. Cl.
| | |
|---|---|
| *B60L 53/30* | (2019.01) |
| *H02J 7/00* | (2006.01) |
| *B60L 58/12* | (2019.01) |
| *B60L 53/20* | (2019.01) |
| *B60L 53/14* | (2019.01) |

(52) U.S. Cl.
CPC .............. *B60L 53/30* (2019.02); *B60L 53/14* (2019.02); *B60L 53/20* (2019.02); *B60L 58/12* (2019.02); *H02J 7/0004* (2013.01); *H02J 7/0021* (2013.01); *H02J 7/0027* (2013.01)

(58) Field of Classification Search
CPC .......... B60L 53/30; B60L 53/14; B60L 53/20; B60L 58/12; H02J 7/0027; H02J 7/0004; H02J 7/0021
USPC ....................................................... 320/109
See application file for complete search history.

(56) References Cited

U.S. PATENT DOCUMENTS

| | | | | |
|---|---|---|---|---|
| 7,653,474 | B2* | 1/2010 | Cawthorne | B60K 6/40 701/99 |
| 8,049,372 | B2* | 11/2011 | Newhouse | B60R 16/03 307/115 |
| 8,289,033 | B2* | 10/2012 | Kajouke | G01R 31/2837 324/633 |
| 9,880,226 | B2* | 1/2018 | Foley | G01N 27/06 |
| 10,017,071 | B2* | 7/2018 | Namou | B60L 58/16 |
| 10,110,103 | B1* | 10/2018 | Hao | H02P 6/06 |
| 10,283,982 | B2* | 5/2019 | Namou | H02J 7/0031 |

* cited by examiner

*Primary Examiner* — M Baye Diao
(74) *Attorney, Agent, or Firm* — Quinn IP Law

(57) ABSTRACT

A DC charging circuit has a pair of switches and a battery pack with a maximum voltage capacity, and a power inverter module (PIM). The pair of switches connects/disconnects the battery pack to/from the PIM. An electric machine has phase windings sharing a motor neutral terminal. The phase windings are electrically connected to respective switching pair of the PIM. A switching module has one or two additional switches selectively connecting the PIM to the station, and a center switch selectively connecting the station to the motor neutral terminal. A controller executes a method that establishes a boost mode of the PIM when the maximum voltage capacity exceeds the maximum charging voltage. The boost mode is established by closing the pair of switches of the RESS, closing the center switch of the switching module and one of the additional switches, and opening the other additional switch if present.

19 Claims, 3 Drawing Sheets

| OM | SA | SB | SC | SD | SE | 28 |
|---|---|---|---|---|---|---|
| 1 | 0 | 0 | 0 | 0 | 0 | — |
| 2 | 0 | 0 | 0 | 1 | 1 | $T_M$; $P_{ACC}$ |
| 3 | 0 | 1 | 1 | 1 | 1 | DCFC; $P_{ACC}$ |
| 4 | 1 | 0 | 1 | 1 | 1 | $P_{ACC}$ |

ONBOARD DC CHARGING CIRCUIT USING TRACTION DRIVE COMPONENTS

INTRODUCTION

An electric powertrain typically includes one or more polyphase/alternating current (AC) electric machines. The phase windings of each electric machine are energized via a power inverter by a high-voltage direct current (DC) battery pack. Switching control of semiconductor switching pairs within the power inverter ultimately generates an AC output voltage suitable for energizing the phase windings, and for ultimately inducing torque-producing machine rotation. The battery packs used in modern plug-in electric or hybrid electric vehicles or other mobile or stationary high-voltage systems may be recharged by connecting the battery pack to an off-board power supply via an onboard charging port.

When the off-board power supply produces an AC charging voltage, an AC-DC converter is used aboard the vehicle to convert the AC charging voltage to a DC voltage suitable for storage in the individual battery cells of the battery pack. The converter may include a passive diode bridge and actively-controlled semiconductor switches whose on/off conducting states are controlled using pulse width modulation (PWM) or other suitable switching control techniques, with such switching control eliminating negative cycles of an AC charging voltage waveform. In a DC fast-charging system, a high-voltage DC power supply is used in lieu of the AC power supply and the AC-DC converter is eliminated, with the DC charging option providing a relatively high-power/high-speed charging option.

Voltage capacities of battery packs used for propulsion aboard modern vehicles having an electric powertrain continue to increase in order to extend electric driving ranges and improve overall driving performance. As a result of such battery improvements, DC fast-charging infrastructure and charging methodologies will continue to evolve in order to provide charging power capabilities matching the charge requirements of the newer battery packs. However, the deliberate pace of integration of higher-power charging stations into existing battery charging infrastructure will ensure a continued need for older, lower-power charging stations, at least for the foreseeable future. As a result of this trend, a given DC fast-charging station may be incapable of fully charging certain high-voltage battery packs.

SUMMARY

The present disclosure relates to an onboard direct current (DC) charging circuit in which powertrain traction drive components are used to ensure backward-compatibility with legacy off-board DC fast-charging stations capable of supplying a charging voltage at a voltage level that is less than a maximum voltage capacity of an onboard high-voltage battery pack.

As noted above, an electric vehicle, whether powered solely using electricity or in a hybrid configuration in which combustible fuel is used to fire an engine, may be equipped with a battery pack having a maximum voltage capacity exceeding the maximum charging voltage capability of the DC fast-charging station. As an illustrative example, a typical 400 volt DC (VDC) battery pack may be fully charged using 400-500 VDC from an off-board DC fast-charging station. However, emerging battery packs may be rated for 800-1000 VDC or higher, and thus are unable to achieve a full state of charge at such charging levels. The present approach is therefore intended to ensure backward compatibility of emerging high-voltage battery packs with existing lower-voltage DC fast-charging infrastructure, doing so via a DC charging circuit that incorporates traction drive components, i.e., motor phase windings, power inverter switches, and other switches, into an integrated circuit topology.

In an illustrative embodiment, the DC charging circuit includes an RESS having a pair of switches and a high-voltage battery pack having a maximum voltage capacity. Additionally, the DC charging circuit includes a power inverter module (PIM), one side of which is electrically connected to the RESS. The pair of switches of the RESS selectively connects/disconnects the battery pack to or from the PIM, i.e., connecting to the PIM when in a closed/binary 1 state and disconnecting from the PIM when in an open/binary 0 state. An electric machine forms part of the DC charging circuit and includes first, second, and third phase windings in an example 3-phase embodiment, with such phase windings sharing a neutral tap or node in common, and with such a node referred to hereinafter as a motor neutral terminal. The first, second, and third phase windings of the electric machine are electrically connected to first, second, and third switching pairs of PIM switches, respectively. Each PIM switching pair includes two controllable semiconductor switches each having an antiparallel connected diode.

The DC charging circuit in this particular embodiment further includes a switching module with a center switch and an additional switch, with the additional switch connected to a positive or negative bus rail. In some configurations, two additional switches may be used, with each respective additional switch connected to a corresponding one of the positive or negative bus rails. The switching module electrically connects the DC charging circuit to the off-board DC fast-charging station, via an intervening charging port of the type understood in the art, during a DC fast-charging operation of the battery pack. In particular, the additional switch (or switches) of the switching module serve to selectively connect the PIM to the DC fast-charging station, with the center switch selectively connecting the DC fast-charging station to the above-noted motor neutral terminal.

A controller is in communication with the PIM, the switching module, and remaining switches within the DC charging circuit. The controller is configured to selectively establish a DC-DC boost mode of the PIM, via transmission of switching control signals to the individual PIM switching pairs, and, based on the operating mode, also to the center switch, the pair of switches of the RESS, and the additional switch(es) of the switching module. This switching control action occurs in response to a detected condition in which the maximum voltage capacity of the battery pack exceeds the maximum charging voltage of the DC fast-charging station.

In a non-limiting example embodiment, the maximum voltage capacity of the battery pack is in the range of 700-1000 VDC, which would put the battery pack at a significantly higher voltage level than a 400-500 VDC version of a legacy DC fast-charging station of the type described above. In other embodiments, the maximum voltage capacity may be at least 125% of the maximum charging voltage.

The switches of the RESS and of the switching module may be embodied as electro-mechanical contactors or, in an alternative embodiment, as solid-state switches such as IGBTs, MOSFETs, or other switchable semiconductor-based components.

The electric machine may be operatively connected to drive wheels of a motor vehicle, e.g., in a hybrid electric or battery electric vehicle configuration.

The DC fast-charging circuit may include an accessory module or device, or multiple such devices, each of which is connected to the PIM and to the center switch of the switching module, such as an air conditioning control module, auxiliary power module, battery cooling module, etc. In such an embodiment, the positioning and control of the center switch in conjunction with control of the PIM switching pairs enables the supply of an accessory voltage to the accessory device(s) at a level voltage lower than the battery pack's current voltage level.

A method is also disclosed for charging a high-voltage battery pack in a DC charging circuit having an RESS, with the RESS including the battery pack and a pair of switches, a PIM having a plurality of PIM switching pairs, an electric machine with first, second, and third phase windings sharing a motor neutral, and the switching module noted above. The method includes detecting a requested DC fast-charging operation of the battery pack in which the charging circuit is electrically connected to a DC fast-charging station.

Additionally, the method includes comparing a maximum charging voltage of the DC fast-charging station to a maximum voltage capacity of the battery pack when the charging operation is successfully detected by the controller, and then establishing a DC-DC boost mode of operation of the PIM via a switching control action of the controller. The DC-DC boost mode, which is established when the maximum charging voltage is less than the maximum voltage capacity, includes commanding a closing of the pair of switches of the RESS as well as the center switch and the additional switch of the switching module, and, if a second additional switch is present in the switching module, commanding an opening of the second additional switch. The additional switch that is closed during the boost mode in the optional "two switch" embodiment is the additional switch that is connected to the opposite bus rail as the center switch, e.g., to the negative bus rail when the center switch is connected to the positive bus rail, and vice versa.

The above summary is not intended to represent every embodiment or aspect of the present disclosure. Rather, the foregoing summary exemplifies certain novel aspects and features as set forth herein. The above noted and other features and advantages of the present disclosure will be readily apparent from the following detailed description of representative embodiments and modes for carrying out the present disclosure when taken in connection with the accompanying drawings and the appended claims.

Figure 1:
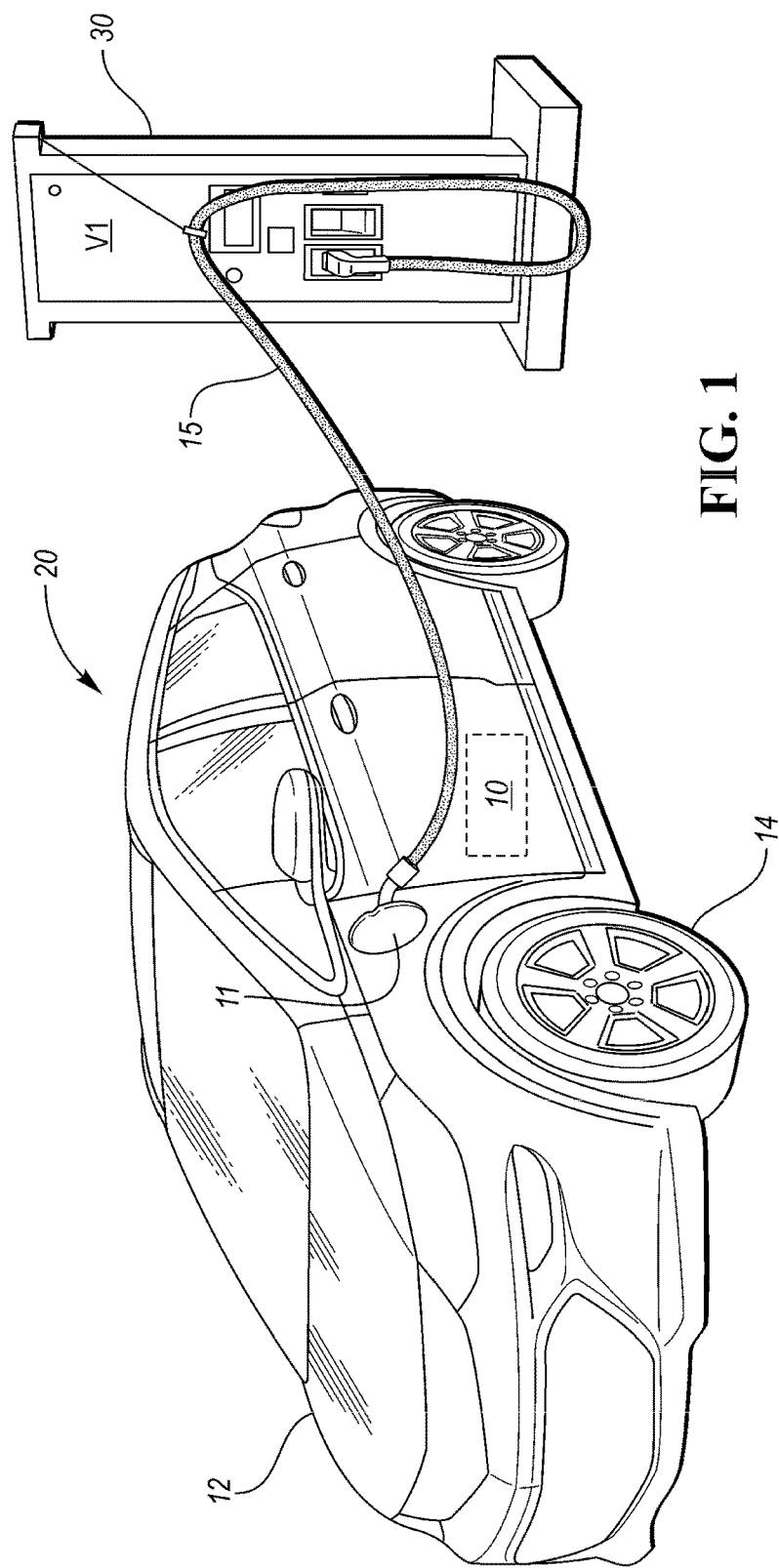
FIG. 1 is a schematic illustration of an example motor vehicle connected to an off-board DC fast-charging station, with the motor vehicle having a DC charging circuit of the type described herein.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Referring to the drawings, wherein like reference numbers refer to the same or like components in the several Figures, a direct current (DC) charging circuit 10 is shown schematically in FIG. 1 as part of a motor vehicle 20. The vehicle 20 is depicted as undergoing a DC fast-charging operation in which the DC charging circuit 10 is electrically connected to an off-board DC fast-charging station 30 via a charging port 11 and a charging cable 15, e.g., using an SAE J1772 charge connector, CHAdeMO, or another suitable regional or national standard charging plug or connector. The present teachings are independent of the particular charging standard that is ultimately employed in a DC fast-charging operation involving the DC fast-charging station 30, and thus the above-noted examples are merely illustrative.

The DC charging circuit 10 may be beneficially used as part of the motor vehicle 20, as well as other electrical systems such as stationary or mobile power plants robots or platforms. For vehicular applications, non-motor vehicles such as aircraft, marine vessels, and rail vehicles may enjoy similar benefits. Likewise, the DC charging circuit 10 may be used as part of a powertrain of a mobile system, such as the example vehicle 20, or in configurations in which the DC fast-charging station 30 is mobile and the DC charging circuit 10 remains stationary. For illustrative consistency, an application of the DC charging circuit 10 as an integral part of the vehicle 20 in a motor vehicle context will be described hereinafter without limiting the present disclosure to such an embodiment.

The vehicle 20 of FIG. 1 includes a body 12 and drive wheels 14. The body 12 may define or include the charging port 11 at a user-accessible location. The vehicle 20 may be variously embodied as a plug-in electric vehicle having a high-voltage battery pack ($B_{HV}$) 126 as shown at far right in FIG. 2 and described below, e.g., a multi-cell lithium ion, zinc-air, nickel-metal hydride, or lead acid direct current battery pack that can be selectively recharged using the off-board DC fast-charging station 30 of FIG. 1. The DC charging circuit 10, as best depicted in FIG. 2, incorporates powertrain/traction drive components of the vehicle 20 whose ordinary functions may include powering an electric machine ($M_E$) 29 to generate and deliver motor torque to the drive wheels 14 for propulsion of the vehicle 20, or for performing other useful work aboard the vehicle 20.

As noted above, emerging electric vehicles may be equipped with high-voltage battery packs having a maximum voltage capacity far exceeding a maximum charging voltage capability (V1) of the DC fast-charging station 30 shown in FIG. 1. That is, while some DC fast-charging stations 30 may be able to provide a maximum charging voltage that matches or exceeds the maximum voltage capacity of a given battery pack 126, older or legacy DC fast-charging stations 30 may exist that can provide charging only at lower voltage levels.

Figure 4:
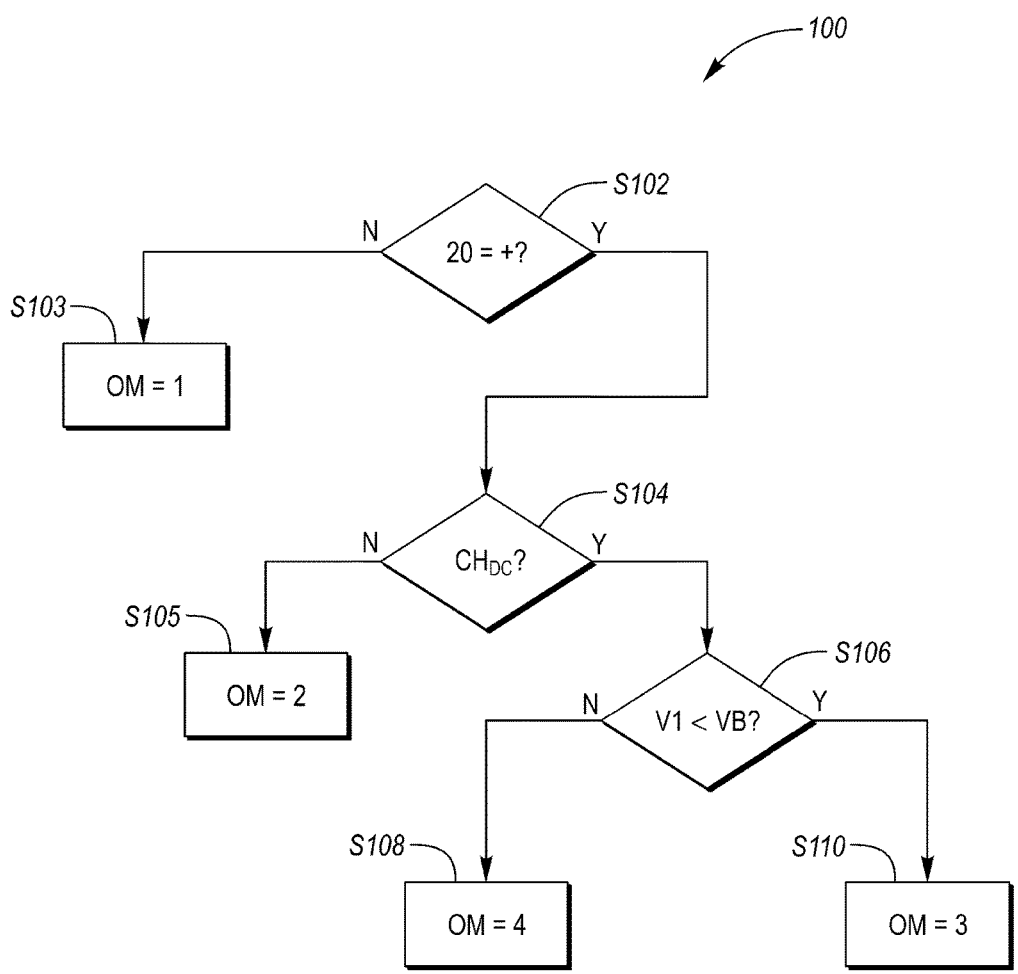
FIG. 4 is a flow chart describing an example method for DC fast-charging of a high-voltage battery pack of the motor vehicle depicted in FIG. 1.

As an illustration, the example DC fast-charging station 30 of FIG. 1 may be capable of providing a maximum charging voltage (V1) of about 400-500 VDC. The battery pack 126 of FIG. 2 may have a maximum voltage capacity of at least 125% of the maximum charging voltage (V1), or as high as 700-1000 VDC in some embodiments. In this situation, the battery pack 126 (FIG. 2) would be unable to achieve a full state of charge using the DC fast-charging station 30. The DC charging circuit 10 as described in detail below with reference to FIGS. 2-4 is therefore intended to address this potential issue of backward compatibility of emerging, high-power battery packs with existing lower-voltage fast-charging infrastructure.

Figures 2, 3:
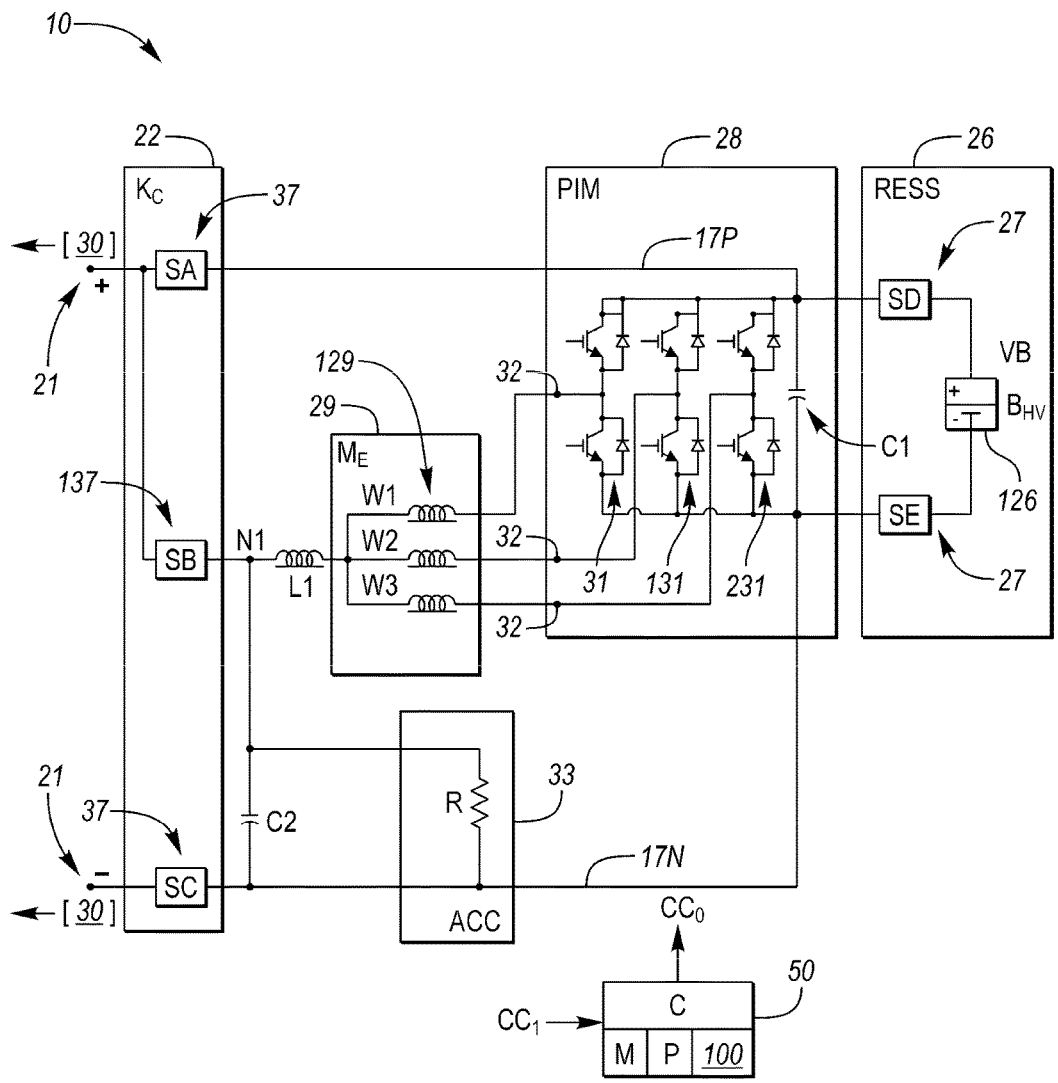
FIG. 2 is a schematic circuit diagram of a possible embodiment of the DC charging circuit shown in FIG. 1.
FIG. 3 is a table depicting possible operating modes and corresponding contactor states for the DC charging circuit of FIG. 2.

Referring to FIG. 2, the DC charging circuit 10 achieves the above-noted benefits by incorporating traction drive components of the vehicle 20 into an integrated charging circuit topology that also includes a switching module ($K_C$) 22. Drive components include a power inverter module (PIM) 28 and a polyphaser/AC electric machine ($M_E$) 29, e.g., a 3-phase motor as shown. The electric machine 29 ultimately produces motor output torque, e.g., to rotate the drive wheels 14 of FIG. 1 and thereby propel the vehicle 20 in a motor vehicle embodiment, or to perform work in other powertrain configurations.

The DC charging circuit 10 additionally includes a rechargeable energy storage system (RESS) 26 that is electrically connected to the PIM 28, i.e., across positive (+) and negative (−) high-voltage bus rails 17P and 17N, respectively. One or more optional accessory devices (ACC) 33, represented in a schematically simplified manner by an equivalent resistance R, may be used as part of the DC charging circuit 10, e.g., high-voltage devices or systems such as an air conditioning control module, auxiliary power module, or battery cooling system. Such accessory devices 33 may be driven at an auxiliary voltage level that, while still high-voltage with respect to typical 12-15 VDC auxiliary/low-voltage levels, is less than the maximum voltage capacity (VB) or present battery voltage of the battery pack 126.

Within the DC charging circuit 10 of FIG. 2, the RESS 26 shown at far right includes a pair of switches 27 labeled as switches SD and SE, and the battery pack 126 noted above. The pair of switches 27 may be alternatively embodied as solid-state switching devices, e.g., MOSFETs or IGBTs, or as electro-mechanical contactors. The RESS 26 may be connected across a DC link capacitor C1 of the PIM 28 as shown, with the battery pack 126 selectively connected to and disconnected from the PIM 28 via closing and opening of the pair of switches 27. If needed, a pre-charge circuit (not shown) may be used to charge the DC link capacitor C1 at a controlled rate so as to equalize the voltage across the pair of switches 27 prior to closing switches SD and SE thereof.

The PIM 28 includes a plurality of PIM switching pairs 31, 131, and 231 each connected to the positive bus rail 17P and the negative bus rail 17N. Individual switches of the PIM switching pair 31, 131, and 231 connected to the positive bus rail 17P are known in the art as "upper" PIM switches. Similarly, the PIM switches forming the PIM switching pairs 31, 131, and 231 connected to the negative bus rail 17N are referred to as "lower" PIM switches. As is well understood in the art, power inverters such as the PIM 28 of FIG. 2 use rapid semiconductor switching control techniques, e.g., PWM signals, to invert DC power supplied from a discharge of the battery pack 126 into AC power suitable for driving the electric machine 29. PWM and other techniques are used to control the output voltage of the PIM 28, e.g., by adjusting pulse width, or to control output frequency by changing the modulation cycle. In particular, the PIM 28 may be controlled by operation of a controller 50 as described below so as to increase or decrease voltage as needed, with increasing voltage referred to as "boost conversion" and decreasing voltage referred to as "buck conversion".

The PIM switching pairs 31, 131, and 231 are electrically connected to individual phase windings 129 of the electric machine 29. In a representative 3-phase embodiment of the electric machine 29, for instance, the electric machine 29 has separate first, second, and third phase windings W1, W2, and W3, with the collective phase windings 129 sharing a motor neutral terminal N1. As the motor inductance of a circuit formed from the windings W1, W2, and W3 may be low for the purposes of the disclosed switching control, an optional inductor L1 may be connected between the motor neutral terminal N1 and the three phase windings W1, W2, and W3. Such placement of the inductor L1 is intended to help ensure that the additional inductor L1 does not affect the torque performance of the electric machine 29.

The PIM switching pairs 31, 131, and 231 are typically controlled to produce desired voltages across the phase windings W1, W2, and W3, and thus a desired motor torque at an output shaft (not shown) of the electric machine 29 during operation of the vehicle 20 shown in FIG. 1. Additionally, switching techniques are known that allow a neutral voltage and electrical current to be closely controlled during operation of the electric machine 29. Therefore, as part of the present approach, and under conditions in which a rotor/output shaft of the electric machine 29 is not rotating, the switching pairs 31, 131, and 231 and an inductance of each phase winding W1, W2, and W3 may be selectively operated as a 3-phase boost converter with input at the motor neutral terminal N1 by controlling the duty cycle of each of the lower switches, i.e., the PIM switch pairs 31, 131, 231 connected to the negative rail 17N. In this case, as is typical for multi-phase converter control, the individual phase legs of the electric machine 29 are switched 120° out-of-phase in a process referred to as "interleaving". Such a process is intended to reduce ripple and other undesirable effects. Thus, for an example 400 amp (400A) charging current, each of the three phase windings W1, W2, and W3 will see 133A.

With respect to the switching module 22 of FIG. 2, this device is configured to electrically connect to the off-board DC fast-charging station 30 of FIG. 1, via an intervening charge port of the type known in the art (omitted for illustrative clarity), during a DC fast-charging operation of the battery pack 126. The switching module 22 includes one or two additional power switches 37, shown for example as another pair of switches 37 labeled as switches SA and SC, selectively connecting the PIM 28 to the DC fast-charging station 30 via positive (+) and/or negative (−) input terminals 21, and a center switch 137 (SB) selectively connecting the DC fast-charging station 30 to the motor neutral terminal N1. The switches 37 labeled as SA and SC in FIG. 2 are respectively connected to the positive (+) and negative (−) bus rails 17P and 17N of the DC charging circuit 10. As noted above, one of the two switches 37 may be used to ensure the desired switching outcome disclosed herein, with such a switch 37 in a single-additional switch embodiment electrically being connected to the opposite bus rail 17P or 17N as the center switch 137.

Electrical sensors 32 may be used on the three phase windings W1, W2, W3, or any two of the phase windings W1, W2, and W3, to measure an individual phase current, with the third phase current being readily calculated from the other two measurements. Optionally, all three of the phase windings W1, W2, and W3 may have a corresponding electrical sensor 32 for redundancy. A filter capacitor C2 is connected between the motor neutral terminal N1 and the negative voltage bus rail 17N. The above-noted optional inductor L1 may be connected between the center switch 137 (SB) and the motor neutral terminal N1 to increase the inductance of a motor winding circuit formed by the phase windings W1, W2, and W3, as well as to enable a lower switching frequency during operation of the PIM 28 as a boost converter.

The DC charging circuit 10 includes the controller (C) 50. The controller 50 includes at least one processor (P) and sufficient memory (M) for storing instructions embodying a method 100, an example of which is described below with reference to FIGS. 3 and 4. The memory (M) includes tangible, non-transitory memory, e.g., read only memory, whether optical, magnetic, flash, or otherwise. The controller 50 also includes sufficient amounts of random access memory, electrically-erasable programmable read only memory, and the like, as well as a high-speed clock, analog-to-digital and digital-to-analog circuitry, and input/output circuitry and devices, as well as appropriate signal conditioning and buffer circuitry.

As part of the present method 100, the controller 50 is in communication with the PIM 28, the switching module 22, the sensors 32, and the RESS 26, and is configured to selectively establish a DC-DC boost mode of the PIM 28 during operating modes in which the maximum charging voltage (V1) of the DC fast-charging station 30 shown in FIG. 1 is less than the maximum voltage capacity (VB) of the battery pack 126 shown in FIG. 2. This control action occurs via transmission of switching control signals (arrow $CC_O$) by the controller 50 to the individual PIM switching pairs 31, 131, and 231. The switching control signals (arrow $CC_O$) ultimately control the duty cycle of the PIM 28.

Additionally, the switching control signals (arrow $CC_O$) control an open/closed state, i.e., binary logic states 0 and 1, respectively, of more of the switches SD and SE of the pair of switches 27 located within the RESS 26, the switches labeled SA and SC located within the switching module 22, and the center switch 137 (SB) which is also located within the switching module 22. In this manner, the generation and transmission of the switching control signals (arrow $CC_O$) by the controller 50 selectively establishes the DC-DC boost mode as a boost control action in response to a detected condition in which the maximum voltage capacity (VB) of the battery pack 126 exceeds the maximum charging voltage (V1) of the DC fast-charging station 30 shown in FIG. 1.

Referring to FIG. 3, the DC charging circuit 10 of FIG. 2 is configured to provide multiple different operating modes, abbreviated as "OM": (1) vehicle-off mode, (2) vehicle propulsion mode, and modes (3) and (4) providing two different charging modes, with mode (3) providing a boost charging mode when the maximum charging voltage V1 is less than the maximum battery voltage capacity (VB) of battery pack 126, and with mode (4) provided when the maximum charging voltage (V1) equals or exceeds the maximum voltage capacity (VB). In an example embodiment, the maximum charging voltage (V1) when operating in mode (3) may be in the range of about 400-500 VDC and the maximum voltage capacity (VB), when newer high-voltage battery packs are used, may be in the range of about 700-1000 VDC as noted elsewhere herein, with other embodiments and voltage levels being possible.

FIG. 3 describes, for each of the above-noted operating modes (OM), the corresponding switch logic state for each of the switches 27, 37, and 137 labeled variously as SA, SB, SC, SD, and SE in FIG. 2, as well as the enabled control mode of the PIM 28. Thus, when the vehicle 20 is turned off and is not charging, i.e., OM=1, each of the respective switches 27, 37, and 137 labeled SA-SE is an "open" logic state (0) and the PIM 28 is turned off, as represented by the "-" symbol in the far right column of FIG. 2. When the vehicle 20 of FIG. 1 is electrically driven in propulsion mode (OM=2), the switches 27 of the RESS 26 shown in FIG. 2, i.e., switches SD and SE, are closed (logic state 1) by operation of the switching control signals (arrow $CC_O$) from the controller 50. The PIM 28 thereafter controls motor torque ($T_M$) from the electric machine 29 of FIG. 2 for propulsion of the vehicle 20 and to power to the optional accessory device(s) 33, abbreviated $P_{ACC}$, if such accessory devices 33 exist within the DC charging circuit 10.

With respect to the DC fast-charging operating modes (OM=3 or 4) shown in FIG. 3, also abbreviated DCFC for mode 3 to indicate a boost mode of operation relative to mode 4, upon plugging the DC charging circuit 10 into the off-board DC fast-charging station 30 depicted in FIG. 1, relevant charging standards ensure that the DC fast-charging station communicates the maximum charging voltage (V1) to the controller 50. As a result, the controller 50 is made aware of the power capabilities of the DC fast-charging station 30 prior to initiation of the charging operation. The controller 50 is also programmed with the power requirements of battery pack 126, and is updated during operation with relevant battery parameters such as state of charge, battery current and voltage, and temperature. The controller 50 therefore determines at the onset of the charging operation whether or not the maximum charging voltage (V1) is less than the maximum voltage capacity (VB).

When the maximum charging voltage (V1) is less than the maximum voltage capacity (VB), i.e., when V1<VB, the switches SB-SE are all closed (logic state 1) and switch SA is opened (logic state 0). The controller 50, upon establishing such switching logic states, thereafter controls the PIM 28 in boost mode to increase the voltage from the off-board DC fast-charging station 30 from the level of V1 to levels suitable for charging the battery pack 126. In operating mode 3, the DC fast-charging station 30 of FIG. 1 also supplied power to the accessory device(s) 33 at the maximum charging voltage (V1).

When the maximum charging voltage (V1) equals or exceeds the maximum voltage capacity (VB), i.e., V1≥VB, the switches SA and SC-SE of FIG. 2 are closed (logic state 1) and switch SB of the switching module 22 is opened (logic state 0). Operating mode (4) commences. With switch SA in a closed state, the battery pack 126 is connected across the bus rails 17P and 17N to the DC fast-charging station 30, and thus the full charging voltage from the DC fast-charging station 30 of FIG. 1 is permitted to reach the battery pack 126. The controller 50, upon establishing such switching states, thereafter controls the duty cycle of the PIM 28 so as to operate the PIM 28 in buck mode, and to thereby supply a reduced accessory voltage to the accessory device(s) 33.

The switching states of FIG. 3 may be best understood with reference to FIG. 4, which depicts an example embodiment of the method 100 for enabling the controller 50 of FIG. 2 to execute a DC fast-charging operation of the battery pack 126, regardless of the actual voltage level of the DC fast-charging station 30 of FIG. 1.

Beginning with step S102, the controller 50 determines whether the vehicle 20 of FIG. 1 is in an on state, i.e., 20=+, e.g., by evaluating an ignition or powertrain logic state. Vehicle wakeup may also initiate when a charge connector disposed at the end of the charging cable 15 of FIG. 1 is inserted into the charging port 11. The method 100 proceeds to step S103 when the vehicle 20 is not running, and to step S104 in the alternative when the vehicle 20 is running.

Step S103 corresponds to the first operating mode (OM=1) of FIG. 3. In response to this mode, the controller 50 opens the switch(es) 37 and the center switch 137 of the switching module 22, i.e., switches SA, SB, and SC, which ensures that the DC charging circuit 10 is fully disconnected from the DC fast-charging station 30 of FIG. 1, and also opens the switches 27 of RESS 26, i.e., switches SD and SE, to fully disconnect the RESS 26 from the PIM 28. The controller 50 also discontinues switching control operations of the PIM 28, effectively shutting off the PIM 28. Although omitted from FIG. 4 for illustrative simplicity, the method 100 thereafter starts anew by repeating step S102.

Step S104 includes evaluating whether the vehicle 20 is being actively charged ($CH_{DC}$) or driven. To this end, the controller 50 is configured to detect whether a transmission or PRNDL setting of the vehicle 20 is in a park state, and an electrical connection between the charging cable 15 of FIG. 1 and the charging port 11, with such a connection establishing the requisite power transfer and communication links between the vehicle 20 and the off-board DC fast-charging station 30, as is well understood in the art. If such a connection is not detected, the method 100 proceeds to step S105. Otherwise, the method 100 proceeds to step S108.

At step S105, the controller 50 determines that the vehicle 20 is in an active propulsion mode in which the electric machine 29 of FIG. 2 is being used to generate and deliver motor torque, e.g., to the drive wheels 14 shown in FIG. 1. In this mode, which corresponds to operating mode (OM=2) of FIG. 2, the controller 50 closes the switches 27 of the RESS 28, i.e., switches SD and SE, which connects the RESS 26 to the PIM 28. The controller 50 also opens the switch(es) 37 and the center switch 137 of the switching module 22, i.e., switches SA, SB, and SC, thereby disconnecting the DC fast-charging station 30 from the DC charging circuit 10. The controller 50 thereafter controls output torque of the electric machine 29 and desired accessory power to the accessory device(s) 33 using onboard power controls.

At step S106, arrived at when the controller 50 has determined at step S104 that a DC fast-charging operation is underway, the controller 50 next receives information from the DC fast-charging station 30 of FIG. 1 describing the maximum charging voltage (V1) that station 30 is capable of providing to the battery pack 126 shown in FIG. 2. The controller 50 thereafter compares the maximum charging voltage (V1) to the maximum voltage capacity (VB) of the battery pack 126. The method 100 continues to step S108 when the maximum charging voltage (V1) equals or exceeds the maximum voltage capacity (VB), i.e., when V1≥VB, and to step S110 in the alternative when V1<VB.

Step S108 is executed in response to the determination by controller 50 at step S106 that the DC fast-charging station 30 is capable of providing the required maximum charging voltage (VB). The controller 50 responds to this determination by closing the pair of switches 27 of the RESS 26, i.e., the switches SD and SE, and closing switches SA and SC. In this mode, i.e., the fourth operating mode (OM=4) of FIG. 3, the controller 50 also commands opening of the center switch 137 (SB). Charging power is thereafter provided through the DC charging circuit 10 to the battery pack 126 via operation of the PIM 28 in the usual manner of DC fast-charging operations, albeit at a higher voltage level than is typical of existing DC fast-charging infrastructure. The circuit topography of FIG. 2 has the added virtue of enabling buck converter function by connecting the accessory device(s) 33 to the motor neutral N1, thus enabling delivery of an accessory supply voltage at a lower voltage level than is provided to the battery pack 126 in this charging scenario.

Step S110 is arrived at when the maximum charging voltage (V1) is less than the maximum voltage capacity (VB), i.e., when the DC fast-charging station 30 of FIG. 2 is incapable of providing the charging power necessary for fully charging the battery pack 126 of FIG. 2. In such an event, the controller 50 closes the switch 37 (SC) and center switch 137 (SB) of the switching module 22 in the embodiment of FIG. 2. The controller 50 also closes both of the switches 27 (SD and SE) of the RESS 26, and opens the additional switch 37 (SA), i.e., the switch that is connected to the same bus rail 17P as the center switch 137. In this mode, i.e., the third operating mode (OM=3) of FIG. 3, the controller 50 controls the PIM switching pairs 31, 131, and 231 as a DC boost converter, using rapid semiconductor switching control, e.g., PWM, to increase the voltage from the DC fast-charging station 30 to a level matching or exceeding the maximum battery capacity (VB) of the battery pack 126.

In the method 100 described above, the controller 50 may enforce an entry condition in which the maximum voltage capacity exceeds the maximum charging capacity by a set amount, e.g., 110-125%, such that the controller 50 establishes the DC-DC boost mode when the maximum voltage capacity (VB) is sufficiently higher than the maximum charging voltage (V1). When the DC charging circuit 10 of FIGS. 1 and 2 is used as part of the motor vehicle 20 having the electric machine 29 and the drive wheels 14, the method 100 may include opening the switch(es) 37 and the center switch 137, and closing the pair of switches 27 of the RESS 26, to thereby enable the propulsion mode (OM=2) of FIG. 3.

The controller 50 may use the electric machine 29 to output motor torque to the drive wheels 14 during such a propulsion mode. Likewise, as part of the method 100 the accessory device(s) 33 are part of the DC charging circuit 10, and thus are electrically connected to the PIM 28 and the center switch 137. The method 100 in such an embodiment includes supplying the accessory device(s) 33 with an accessory voltage through the motor neutral terminal N1 at a voltage level that is less than the voltage level of the battery pack 126. Accessory power may be supplied either in the presence or absence of torque-producing operation of the electric machine 29. In other words, the accessory device(s) 33, if present, can operate during driving modes of the vehicle 20 of FIG. 1 as well as when the vehicle 20 is parked or charging.

One of ordinary skill in the art will appreciate, in view of the disclosure, that variations of the topology of FIG. 2 may be realized without departing from the intended inventive scope. For instance, the center switch 137, shown in FIG. 2 as being connected to the positive terminal 21 and positive bus rail 17P, may be connected instead to the negative terminal 21 and negative bus rail 17N. Also, one of the switches 37 shown in the switching module 22 of FIG. 2 may be optionally eliminated. The eliminated switch is the particular switch that is connected to the same terminal 21 and bus rail 17N or 17P as the center switch 137, i.e., the switch SA in the example configuration of FIG. 2. To operate in this particular mode, the center switch 137 is opened and the PIM switches, i.e., PIM switching pairs 31, 131, and 231, are all turned off. This allows electrical current to flow through the diodes of the PIM switching pairs 31, 131, and 231 within the PIM 28. In this optional configuration, the accessory device(s) 33 cannot be used, as motor neutral terminal N1 may operate at the full voltage of the battery pack 126.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

The invention claimed is:

1. A direct current (DC) charging circuit for use with an off-board DC charging station providing a maximum charging voltage, the DC charging circuit comprising:
   a positive bus rail and a negative bus rail;
   a rechargeable energy storage system (RESS) connected across the positive and negative bus rails, and including a pair of switches and a high-voltage battery pack having a maximum voltage capacity;
   a power inverter module (PIM) that is electrically connected to the RESS through the positive and negative bus rails and the pair of switches, the PIM including a plurality of PIM switching pairs, wherein the pair of switches of the RESS selectively connects or disconnects the battery pack to or from the PIM, respectively;
   an electric machine having first, second, and third phase windings sharing a motor neutral terminal, wherein the first, second, and third phase windings are electrically connected to a first pair, a second pair, and a third pair of the plurality of PIM switching pairs, respectively;
   a switching module having positive and negative input terminals configured to receive a DC charging voltage from the DC fast-charging station during a requested DC fast-charging operation of the battery pack, the switching module having a first additional switch selectively connecting the PIM to the DC fast-charging station through one of the positive or negative input terminals, and a center switch selectively connecting the DC fast-charging station to the motor neutral terminal; and
   a controller in communication with the PIM and the switching module that is configured, as a charging control action, to selectively establish a DC-DC boost mode of the PIM responsive to a detected condition in which the maximum voltage capacity of the battery pack exceeds the maximum charging voltage of the DC fast-charging station, wherein the controller establishes the DC-DC boost mode by closing the pair of switches of the RESS, and closing the center switch and the first additional switch of the switching module.

2. The DC charging circuit of claim 1, wherein the switching module includes a second additional switch selectively connecting the PIM to the DC fast-charging station through the positive or negative input terminal that is not connected to the first additional switch, wherein the controller establishes the DC-DC boost mode by opening the second additional switch.

3. The DC charging circuit of claim 1, wherein the maximum charging voltage is in a range of 400-500 volts DC (VDC) and the maximum voltage capacity is in a range of 700-1000 VDC during detection of the entry condition, and the one or two additional switches and the center switch are rated for at least 400 amps.

4. The DC charging circuit of claim 1, wherein each switch of the pair of switches of the RESS, the first additional switch of the switching module, and the center switch of the switching module is an electro-mechanical contactor.

5. The DC charging circuit of claim 1, wherein at least one switch of the pair of switches, the first additional switch of the switching module, and the center switch of the switching module includes one or more of a solid-state switch and a diode.

6. The DC charging circuit of claim 5, wherein the pair of switches, the first additional switch, and the center switch include one or more of a solid-state switch and a diode.

7. The DC charging circuit of claim 1, wherein the DC charging circuit is part of a motor vehicle that includes the electric machine, the electric machine having the first, second, and third phase windings and being configured to output motor torque to a set of drive wheels of the vehicle during a propulsion mode, and wherein the controller is configured to open the first additional switch and the center switch of the switching module and close the pair of switches of the RESS to enable the propulsion mode.

8. The DC charging circuit of claim 1, further comprising: an accessory device connected to the PIM and to the center switch, such that the accessory device is supplied with an accessory voltage that is less than the maximum voltage capacity of the battery pack.

9. The DC charging circuit of claim 8, wherein the accessory device is selected from the group consisting of: an air conditioning control module, an auxiliary power module, and a battery cooling module.

10. The DC charging circuit of claim 1, further comprising an inductor connected between the motor neutral terminal and the first, second, and third phase windings.

11. A method for charging a high-voltage battery pack in a direct current (DC) charging circuit having a rechargeable energy storage system (RESS) that includes a battery pack connected across positive and negative bus rail by a pair of switches, a power inverter module (PIM) having a plurality of PIM switching pairs, an electric machine with first, second, and third phase windings sharing a motor neutral terminal, and a switching module having positive and negative input terminals, the switching module further having one or two additional switches connecting the PIM to an off-board DC fast-charging station through the respective positive and negative input terminals, and a center switch that is connected between the positive input terminal and the motor neutral terminal, the method comprising:
   detecting, via a controller, a requested DC fast-charging operation of the battery pack in which the DC charging circuit is electrically connected to the off-board DC fast-charging station;
   responsive to detecting the requested DC fast-charging operation, comparing a maximum charging voltage of the DC fast-charging station to a maximum voltage capacity of the battery pack; and
   establishing a DC-DC boost mode of the PIM via the controller when the maximum charging voltage is less than the maximum voltage capacity, including closing the pair of switches and the center switch, and opening one switch of the one or two additional switches of the switching module.

12. The method of claim 11, wherein an entry condition of the charging control action is the maximum voltage capacity of the battery pack being at least 125% of the maximum charging voltage of the DC fast-charging station, such that the controller establishes the DC-DC boost mode only when the maximum voltage capacity is at least 125% of the maximum charging voltage.

13. The method of claim 12, wherein the maximum charging voltage is in a range of 400-500 volts DC (VDC) and the maximum voltage capacity is in a range of 700-800 VDC during the detected entry condition.

14. The method of claim 11, wherein the pair of switches of the RESS, the one or two additional switches of the switching module, and the center switch of the switching module are electro-mechanical contactors.

15. The method of claim 11, wherein at least one switch of the pair of switches of the RESS, the one or two additional switches of the switching module, and the center switch of the switching module is a solid-state switch.

16. The method of claim 15, wherein the pair of switches of the RESS, the one or two additional switches, and the center switch are solid-state switches.

17. The method of claim 11, wherein the DC charging circuit is part of a motor vehicle having the electric machine and a set of drive wheels, the method further comprising:
   opening the one or two additional switches and the center switch of the switching module and closing the pair of switches of the RESS to enable a propulsion mode; and
   using the electric machine to output motor torque to the set of drive wheels during a propulsion mode.

18. The method of claim 11, further comprising:
   supplying an accessory module with an accessory voltage through the motor neutral terminal that is less than the maximum charging voltage.

19. The method of claim 18, wherein the accessory module is selected from the group consisting of: an air conditioning control module, an auxiliary power module, and a battery cooling module.

* * * * *